(12) United States Patent
Nistala et al.

(10) Patent No.: US 11,256,764 B2
(45) Date of Patent: Feb. 22, 2022

(54) MANAGING CONTENT SEARCHES IN COMPUTING ENVIRONMENTS

(71) Applicant: EMC IP HOLDING COMPANY LLC, Hopkinton, MA (US)

(72) Inventors: Amrita Nistala, Vishakapatnam (IN); Mainak Roy, Kolkata (IN); . Avinash, Bangalore (IN); Vamsi Krishna Tadikamalla, Chennai (IN)

(73) Assignee: EMC IP Holding Company LLC, Hopkinton, MA (US)

(*) Notice: Subject to any disclaimer, the term of this patent is extended or adjusted under 35 U.S.C. 154(b) by 194 days.

(21) Appl. No.: 15/970,180

(22) Filed: May 3, 2018

(65) Prior Publication Data

US 2019/0340298 A1   Nov. 7, 2019

(51) Int. Cl.
| | |
|---|---|
| *G06F 16/951* | (2019.01) |
| *G06F 16/907* | (2019.01) |
| *G06F 16/2452* | (2019.01) |
| *G06F 16/2457* | (2019.01) |
| *G06F 16/9032* | (2019.01) |

(52) U.S. Cl.
CPC ...... *G06F 16/951* (2019.01); *G06F 16/24522* (2019.01); *G06F 16/24573* (2019.01); *G06F 16/907* (2019.01); *G06F 16/90324* (2019.01)

(58) Field of Classification Search
CPC ............... G06F 16/9535; G06F 17/241; G06F 17/30657; G06F 16/907; G06F 16/951; G06F 16/24573; G06F 16/90324; G06F 16/24522
See application file for complete search history.

(56) References Cited

U.S. PATENT DOCUMENTS

| | | | | |
|---|---|---|---|---|
| 2005/0256867 | A1* | 11/2005 | Walther | G06F 16/9535 |
| 2006/0010128 | A1* | 1/2006 | Suzuki | G06F 16/35 |
| 2008/0033983 | A1* | 2/2008 | Ko | H04N 21/8405 |
| 2008/0097985 | A1* | 4/2008 | Olstad | G06F 16/907 |
| 2008/0319973 | A1* | 12/2008 | Thambiratnam | G06F 16/313 |
| 2010/0169778 | A1* | 7/2010 | Mundy | G06F 16/9577 715/716 |
| 2011/0296536 | A1* | 12/2011 | Muller | G06F 16/40 726/30 |
| 2012/0323888 | A1* | 12/2012 | Osann, Jr. | G06F 16/9535 707/722 |
| 2013/0212089 | A1* | 8/2013 | Lederer | G06F 16/954 707/723 |
| 2015/0294018 | A1* | 10/2015 | Lu | G06F 16/9574 707/730 |
| 2016/0275190 | A1* | 9/2016 | Seed | H04W 4/70 |
| 2020/0196020 | A1* | 6/2020 | Mohamed | H04L 63/0861 |

* cited by examiner

*Primary Examiner* — Apu M Mofiz
*Assistant Examiner* — Farhad Agharahimi
(74) *Attorney, Agent, or Firm* — Krishnendu Gupta; Lesley Leonessa

(57) ABSTRACT

A method is used in managing content searches in computing environments. The method receives, by a repository, a search phrase to retrieve content associated with the search phrase, and identifies at least one content related to the search phrase. The method modifies a metadata description associated with the content according to the search phrase. The method returns the content and the modified metadata description.

20 Claims, 7 Drawing Sheets

MANAGING CONTENT SEARCHES IN COMPUTING ENVIRONMENTS

BACKGROUND

Technical Field

This application relates to managing content searches in computing environments.

Description of Related Art

As the value and use of information continues to increase, businesses seek additional ways to provide information, and customers seek additional ways to obtain information. Providers of enterprise and client infrastructure solutions seek to provide customers with accurate information for their products and services across multiple lines of business (LOBs). One manner to provide information is through a search engine that stores relevant content in a repository, and serves up the content, such as help information, technical support, etc., when a customer enters a search phrase into the search engine. The search engine returns the content with a link to the content so that the customer may access the content, and a description of the content. The description of the content is referred to as the metadata description.

Ideally, the results of the search provide the customer with content relevant to their search phrase, and the customer selects the content (i.e., "clicks" on the results provided by the search engine). Businesses measure the rate at which the customer performs a desired action, such as selecting the content, filling out a form, etc. through a conversion rate. For example, a user entering a search phrase in a search engine is a "visitor", but when that user clicks on a link in the search engine results, that user is converted to a "consumer of the information". Thus, an example of a conversion rate may be when a user is converted from a "visitor" to a "consumer of the information". Businesses often optimize their search engine results to increase the conversion rate. This optimization is referred to as Conversion Rate Optimization (CRO).

SUMMARY OF THE INVENTION

In accordance with one aspect of the invention is a method is used in managing content searches in computing environments. A repository receives a search phrase to retrieve content associated with the search phrase. The method identifies at least one content related to the search phrase. The method modifies a metadata description associated with the content according to the search phrase, and returns the content and the modified metadata description.

In accordance with one aspect of the invention is a system is used in managing content searches in computing environments. A repository receives a search phrase to retrieve content associated with the search phrase. The system identifies at least one content related to the search phrase. The system modifies a metadata description associated with the content according to the search phrase, and returns the content and the modified metadata description.

In accordance with another aspect of the invention, a computer program product comprising a computer readable medium is encoded with computer executable program code. The code enables execution across one or more processors for managing content searches in computing environments. A repository receives a search phrase to retrieve content associated with the search phrase. The code identifies at least one content related to the search phrase. The code modifies a metadata description associated with the content according to the search phrase, and returns the content and the modified metadata description.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
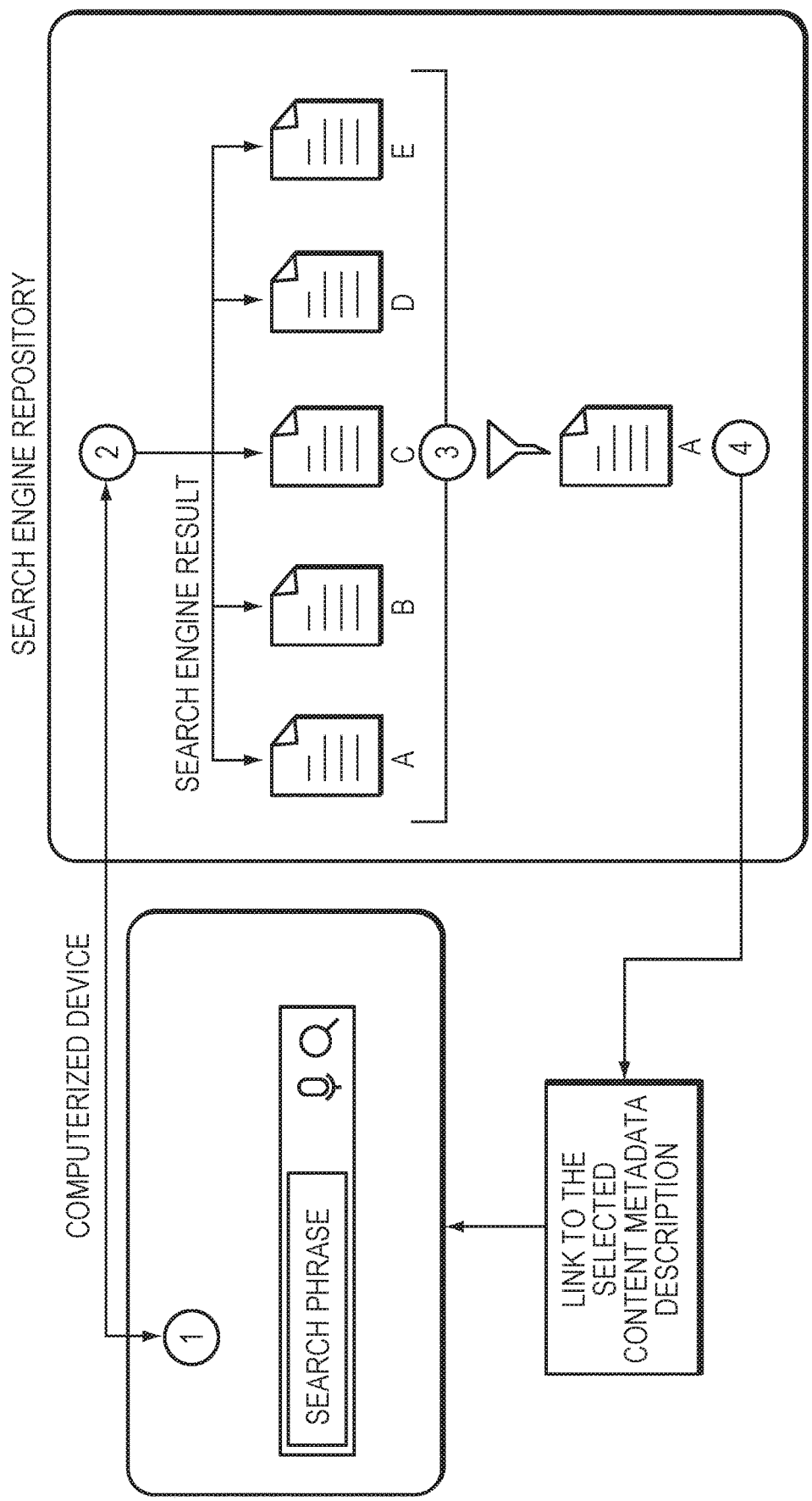
FIG. 1 is a simplified illustration of a conventional search engine result, in accordance with an embodiment of the present disclosure.

Described below is a technique for use in managing content searches in computing environments, which technique may be used to provide, among other things, receiving, by a repository, a search phrase to retrieve content associated with the search phrase, identifying at least one content related to the search phrase, modifying a metadata description associated with the content according to the search phrase, and returning the content and the modified metadata description.

Business place great importance on making relevant information searchable and available. To this effect, businesses employ search engine optimization (SEO) tactics to create a sustainable model that can be employed across LOBs. One goal is to provide customers with relevant information quickly and effectively. The goal of SEO is to ensure that relevant content appears higher in a search result so that the customer will select the content, and therefore, contribute to the conversation rate. However, SEO cannot assure that the customer will actually select the content that is presented in the search result. Usability studies have determined that an average person takes less than 10 seconds before the person selects from the content presented in the search results. As technology advances, that time frame continues to be drastically reduced. It is the customer's choice whether to select any of the links provided in the search engine search result. Thus, one goal of the techniques described herein is to increase the conversion rate of users who select from the search engine results to become a "consumer of the information" that is provided, for example, instead of contacting Tech Support to locate the same information that was provided by the search engine results.

When a customer enters a search phrase in a search engine, the search engine results may be relevant to the customer's query. However, if the content, more specifically, the metadata description, is not what the customer is looking for, the customer may determine that the results are not relevant to the search phrase. When the customer does not find content relevant to the entered search phrase, the customer may call Tech Support. Thus, another goal of the technique disclosed herein is to reduce the call volume at call centers when customers do not find relevant information through the search engine despite the relevant information being returned through the search engine results.

As described herein, in at least one embodiment of the current technique, a user enters a search phrase into a search engine. The search engine returns indexed content that is relevant to the search phrase. The method modifies the metadata description associated with the indexed content, mapping the metadata description to the search phrase. The method returns the indexed content with the modified metadata description to increase the CRO. In other words, the current technique modifies the metadata description in a way that is relevant to the user's search phrase. When the user sees the modified metadata description, it is more obvious to the user that the search engine results match the user's search phrase, and there is a better chance that the user will be converted from a "visitor" to a "consumer of the information".

Conventional technologies do not provide metadata descriptions with content returned from search engines that are relevant to the search phrase entered into the search engine. Conventional technologies do not provide a technique to influence the customer's mind to select any of the content provided in the search engine search result. Conventional technologies do not reduce the number of Request for Information (RFI) based calls to Tech Support. Conventional technologies do not optimize the CRO without modifying the existing infrastructure or without adding an extra layer of hardware. Conventional technologies do not build a repository of cross mapped search phrases and related metadata descriptions. Conventional technologies do not create a "better" metadata description that may be used in future search engine search results.

By contrast, in at least some implementations in accordance with the current technique as described herein, a repository receives a search phrase to retrieve content associated with the search phrase. The method identifies at least one content related to the search phrase. The method modifies a metadata description associated with the content according to the search phrase, and returns the content and the modified metadata description.

Thus, the goal of the current technique is to provide a method and a system for managing content searches in computing environments and to encourage users to select search engine result contents relevant to the users' search phrases to increase CRO, and reduce calls to Tech Support.

In at least some implementations in accordance with the current technique described herein, the use of managing content searches in computing environments can provide one or more of the following advantages: improving the conversation rate by dynamically modifying the metadata description result of the search engine search, ensuring that customers will consume the information provided by the results of the search engine search, reducing the dependency to call Tech Support, and using the robot.txt and the sitemap files to return a modified metadata description without modifying the existing infrastructure or without adding an extra layer of hardware.

In contrast to conventional technologies, in at least some implementations in accordance with the current technique as described herein, a method manages content searches in computing environments. A repository receives a search phrase to retrieve content associated with the search phrase. The method identifies at least one content related to the search phrase. The method modifies a metadata description associated with the content according to the search phrase, and returns the content and the modified metadata description.

In an example embodiment of the current technique, the method stores the modified metadata description in a second repository. The method identifies at least one content in response to receiving a new search phrase to retrieve content associated with the new search phrase, and returns the content and the modified metadata description.

In an example embodiment of the current technique, the method restricts a web crawler from indexing the repository.

In an example embodiment of the current technique, when the method identifies at least one content related to the search phrase, based on the search phrase, the method aggregates a set of related contents into a search pool, where each related content is indexed based on a respective metadata description associated with a respective related content. The method selects at least one content from the search pool. The method provides the metadata description of the content to a metadata description converter, where the metadata description converter analyzes the search phrase and creates a set of keywords that are similar to the search phrase.

In an example embodiment of the current technique, when the method modifies the metadata description associated with the content according to the search phrase, the metadata description converter receives the metadata description associated with the content, where the metadata description comprises at least one term. The method then replaces the term with at least one keyword, where the search phrase comprises the keyword.

In an example embodiment of the current technique, when the method replaces the term with the keyword, the method identifies terms in the content that are similar to the keyword in the search phrase, and creates the modified metadata description from the identified terms.

In an example embodiment of the current technique, when the method creates the modified metadata description from the identified terms, the method validates the modified metadata description for description accuracy.

In an example embodiment of the current technique, when the method returns the content and the modified metadata description, the method receives from the second repository, the modified metadata description and a link to the content, where the content resides in the repository.

In an example embodiment of the current technique, when the method returns the content and the modified metadata description, the method instructs, via a sitemap, a web crawler to select the modified metadata description from the second repository instead of selecting the metadata description from the repository in which the content resides.

Referring now to FIG. 1, shown is a simplified illustration of a conventional search engine result, in accordance with an embodiment of the present disclosure. A user (not shown), using a computerized device, enters a search phrase into a search engine (1). The method searches a search engine repository of indexed content, and returns indexed content with original metadata descriptions, for example, "A", "B", "C", "D" and "E". The related content is pooled based on the search phrase (2). The search engine selects the content with the most appropriate metadata description (3), for example, document "A", and returns that selected content in response to the user's search phrase (4). The content is returned with a link to the content and the metadata description back to the computerized device.

Figure 2:
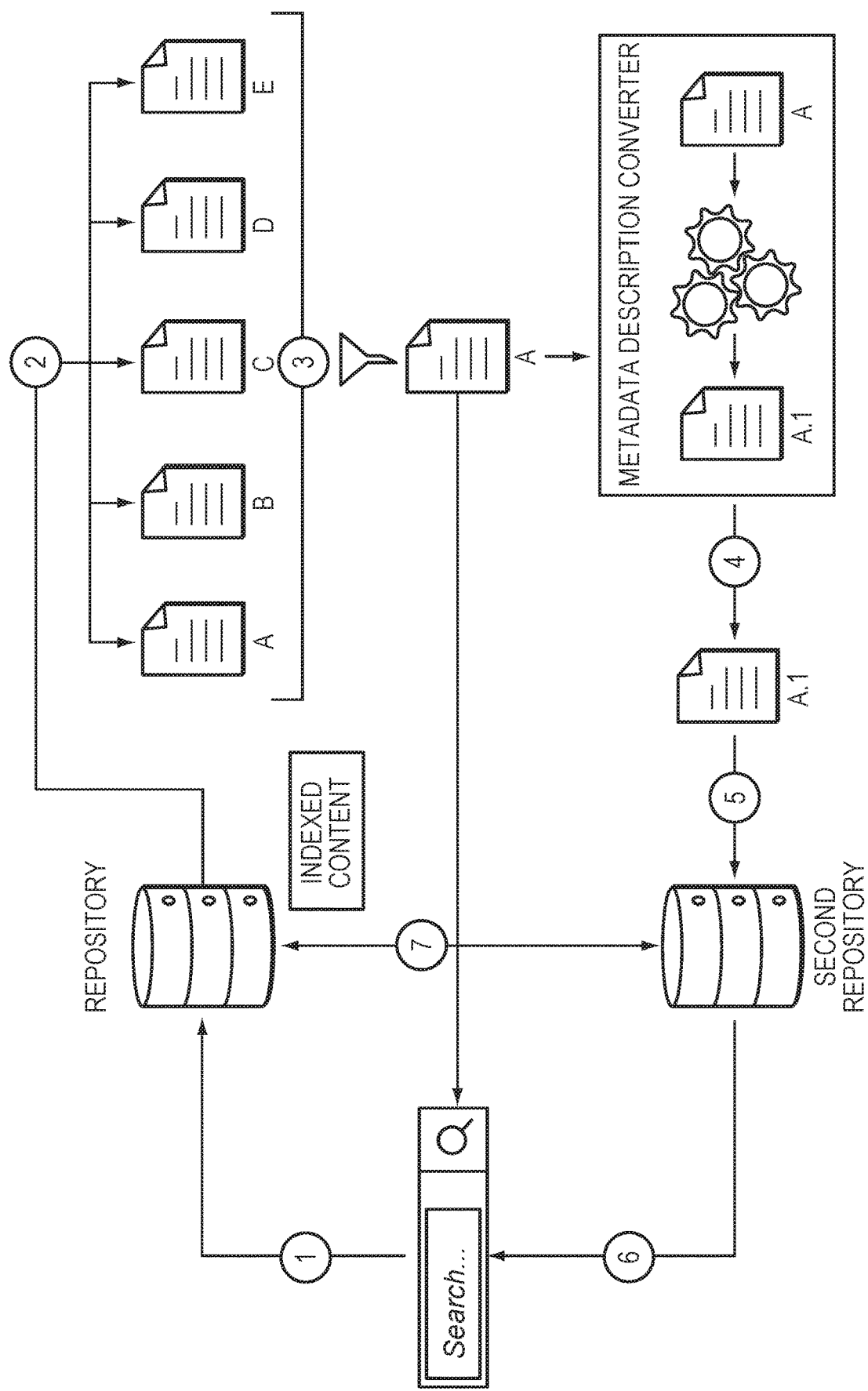
FIG. 2 is a simplified illustration of an optimized search engine result, in accordance with an embodiment of the present disclosure.

FIG. 2 is a simplified illustration of an optimized search engine result, in accordance with an embodiment of the present disclosure. A user (not shown) enters a search phrase into the search engine (1). The search phrase is received by the Repository. The method searches the repository of indexed content, and the related content is pooled based on the search phrase (2). The search engine returns the relevant indexed contents with the original metadata descriptions for example, "A", "B", "C", "D" and "E". The content with the most appropriate metadata description is selected (3), for example, document "A". In an example embodiment, if it is determined that the metadata description does not match the search phrase, the selected content is received by a metadata description converter. The method, via the metadata description converter, replaces keywords in the metadata description to create the modified metadata description (4). The modified metadata description is stored in a file, for example, the "A.1" file. In an example embodiment, the method may also suggest best fit lines or paragraphs from the selected content. In another example embodiment, the method may highlight keywords or key phrases in the now modified metadata description. In an example embodiment all modified metadata descriptions are stored in a second repository for future keyword searches (5). The method returns, as the result of the search engine search, the selected content with the modified metadata description (6). In this example embodiment, the method returns the content, for example, document "A", with the modified metadata description, "A.1". In an example embodiment, future search phrase searches are checked within the second repository. If matched content is located (7), the method returns the matched content with the modified metadata description stored in the second repository. In other words, the matched content is sent directly as the output of the search engine result, without going through the metadata description converter.

Figure 3:
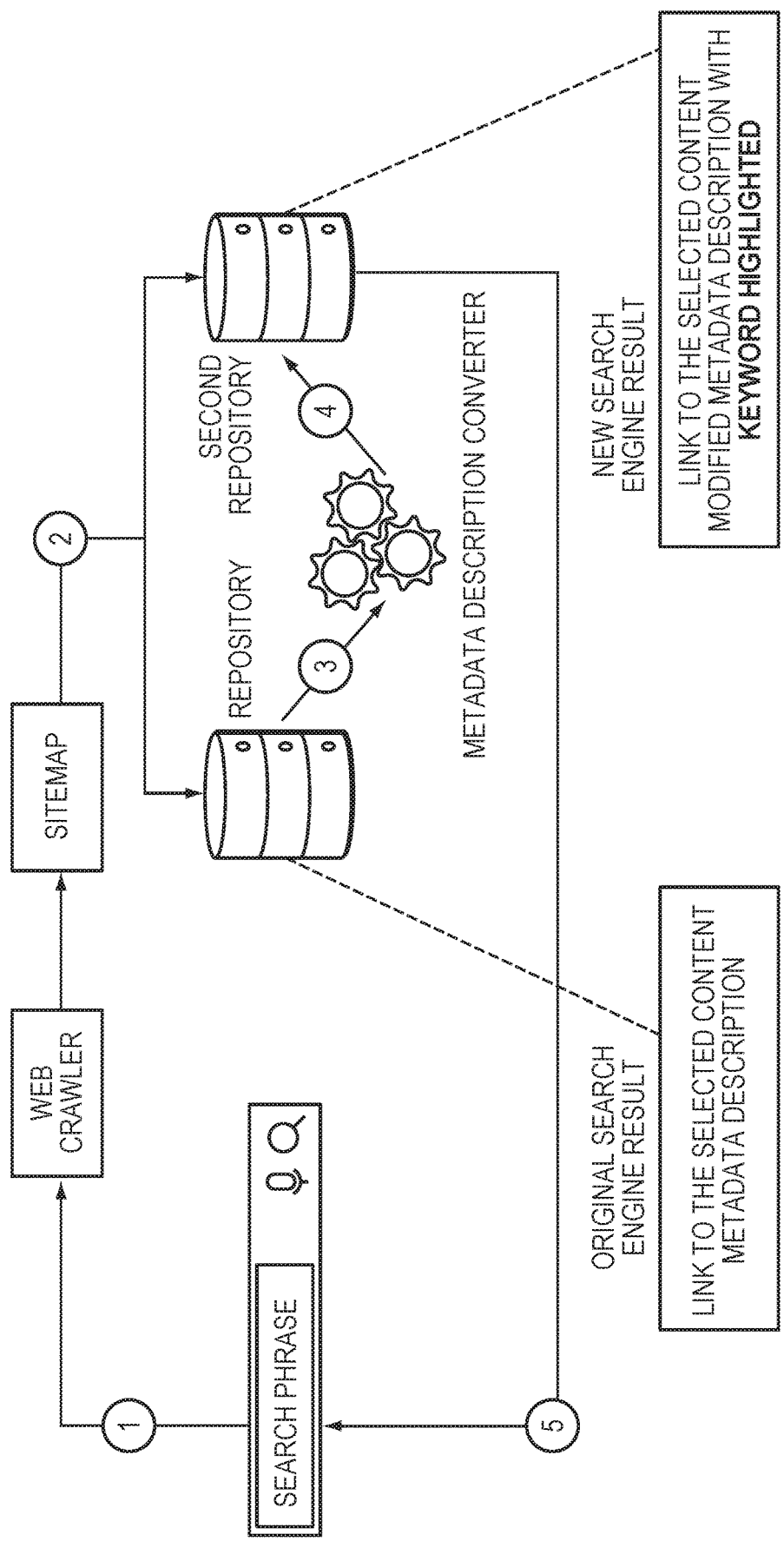
FIG. 3 is a flow diagram illustrating processes that may be used in connection with techniques disclosed herein.

FIG. 3 is a flow diagram illustrating processes that may be used in connection with techniques disclosed herein. A user (not shown) enters a search phrase into the search engine (1). The method searches the repository of indexed content, and the related content is pooled based on the search phrase (2). In an example embodiment, a web crawler, such as a robot.txt file, instructs web crawlers whether or not to index and/or follow the content in repository and second repository. A sitemap illustrates the connections between, for example, web pages on a website. In an example embodiment, the repository provides the selected content (3). The metadata description converter modifies the metadata description, and stores the modified metadata description in the second repository (4). FIG. 3 illustrates, as the original search engine result, the selected content with the (original) metadata description. The search engine returns, as a result of the search phrase search, the new search engine result, which is the selected content with the modified metadata description (5). In an example embodiment, the keywords in the search phrase are shown highlighted.

In an example embodiment, a user has entered the search phrase "Support Plus Benefits" into a search engine. The original search result returns a hyperlink to the content "Product Support and Support Plus", with original metadata description, "Experience the advantages of Support Plus. You and your employees need to feel securing in your selection of end-user hardware". The new search engine result returns a hyperlink to the content "Product Support and Support Plus" (i.e., the same content that was returned with the original metadata description), with the modified metadata description, "With Product Support service, enjoy the various benefits such as 24×7 priority access, automated case creation, next business day onsite repair". In this example embodiment, the keywords "Support Plus" and "benefits" are highlighted, matching the keywords in the search phrase entered by the user. Thus, the modified metadata description matches the keywords the user entered into the search engine, and the user is more likely to select the content because the modified metadata description of the content more closely matches the user's search phrase.

Figure 4:
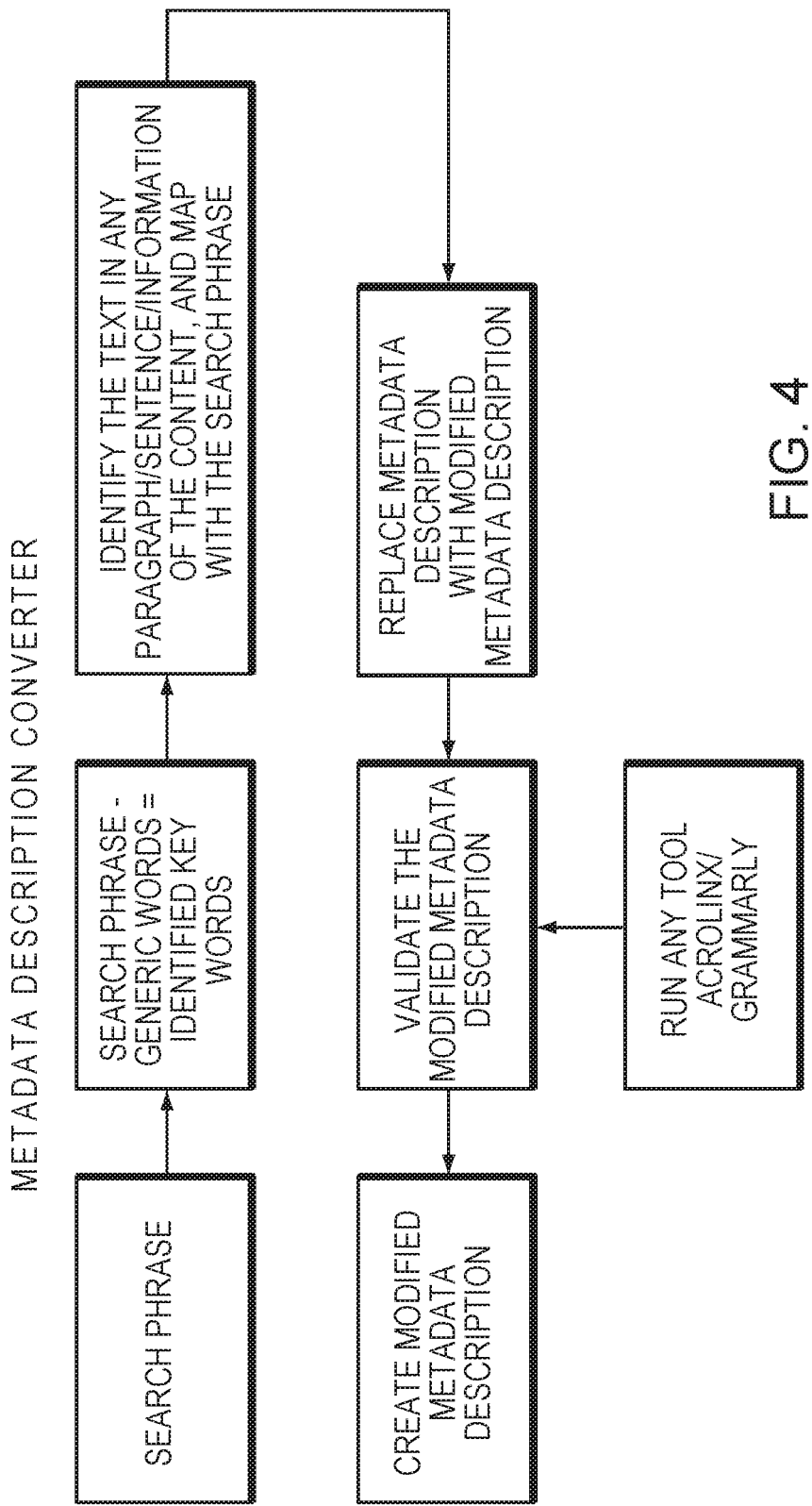
FIG. 4 is an illustration of a metadata description converter, in accordance with an embodiment of the present disclosure.

FIG. 4 is an illustration of a metadata description converter, in accordance with an embodiment of the present disclosure. The metadata description converter receives the search phrase, and omits generic words, for example, "a", "an", "the", etc. The method, via the metadata description converter, identifies text in the content, for example, any information, sentence, paragraph, etc., that matches the search phrase, and maps that text with the search phrase to create the modified metadata description. The method then replaces the metadata description with the modified metadata description, and validates the modified metadata description. The validation may include verifying that the modified metadata description is, for example, technically accurate and/or grammatically correct. This step may be performed, for example, with tools such as Acrolinyx, Grammarly, etc. Once validated, the modified metadata description has been created.

Figure 5:
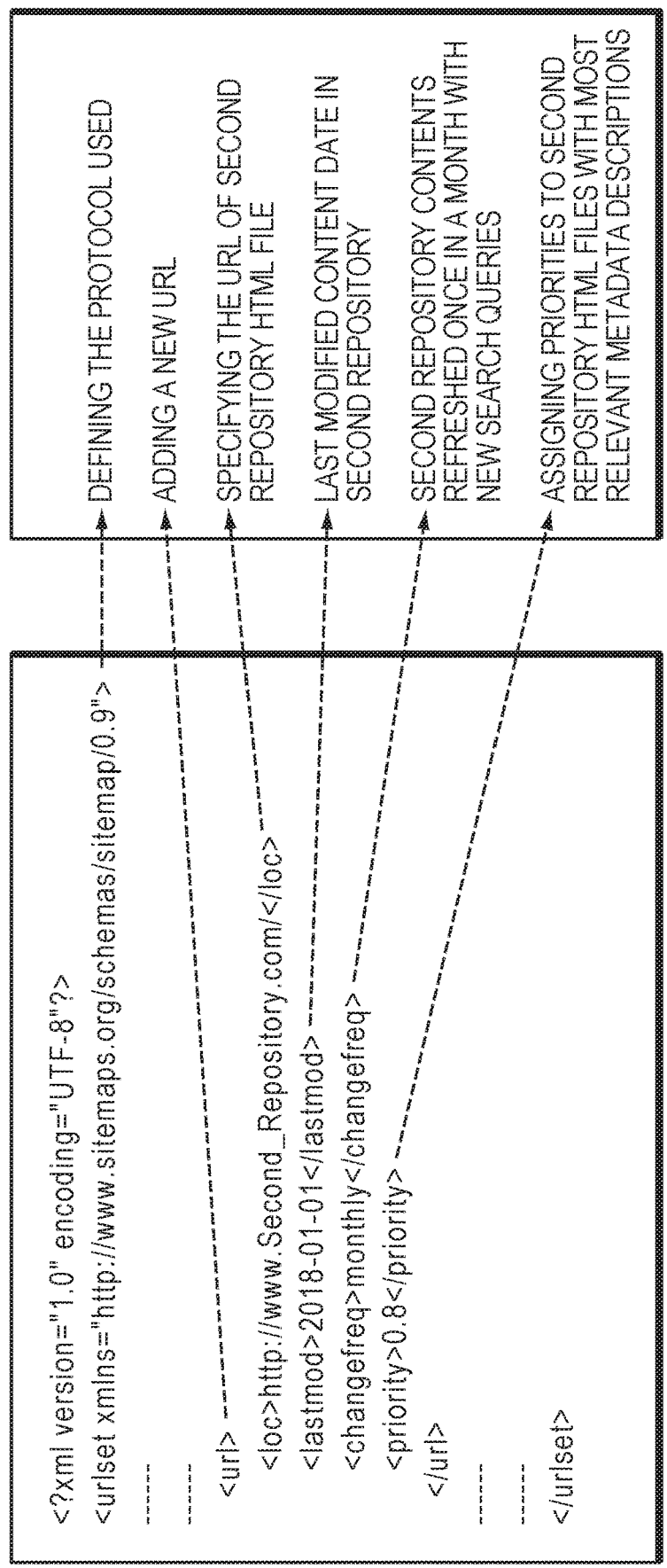
FIG. 5 is an illustration of a modified sitemap file, in accordance with an embodiment of the present disclosure.

FIG. 5 is an illustration of a modified sitemap file, in accordance with an embodiment of the present disclosure. In this example embodiment, the sitemap contains the last modified content date in the second repository, and also contains a command to refresh the modified metadata descriptions in the second repository on a monthly basis. In an example embodiment, the method refers to the last modified content date to determine the most recently modified metadata description for a particular search phrase. In other words, the most recently created modified metadata description is returned for a search phrase. In an example embodiment, the frequency with which the metadata descriptions in the second repository are refreshed is a tunable value, and can be modified. The frequency may be modified based on the search phrases received by the search engine. The sitemap also assigns priorities to the modified metadata descriptions in the second repository with the most relevant metadata descriptions.

Figure 6:
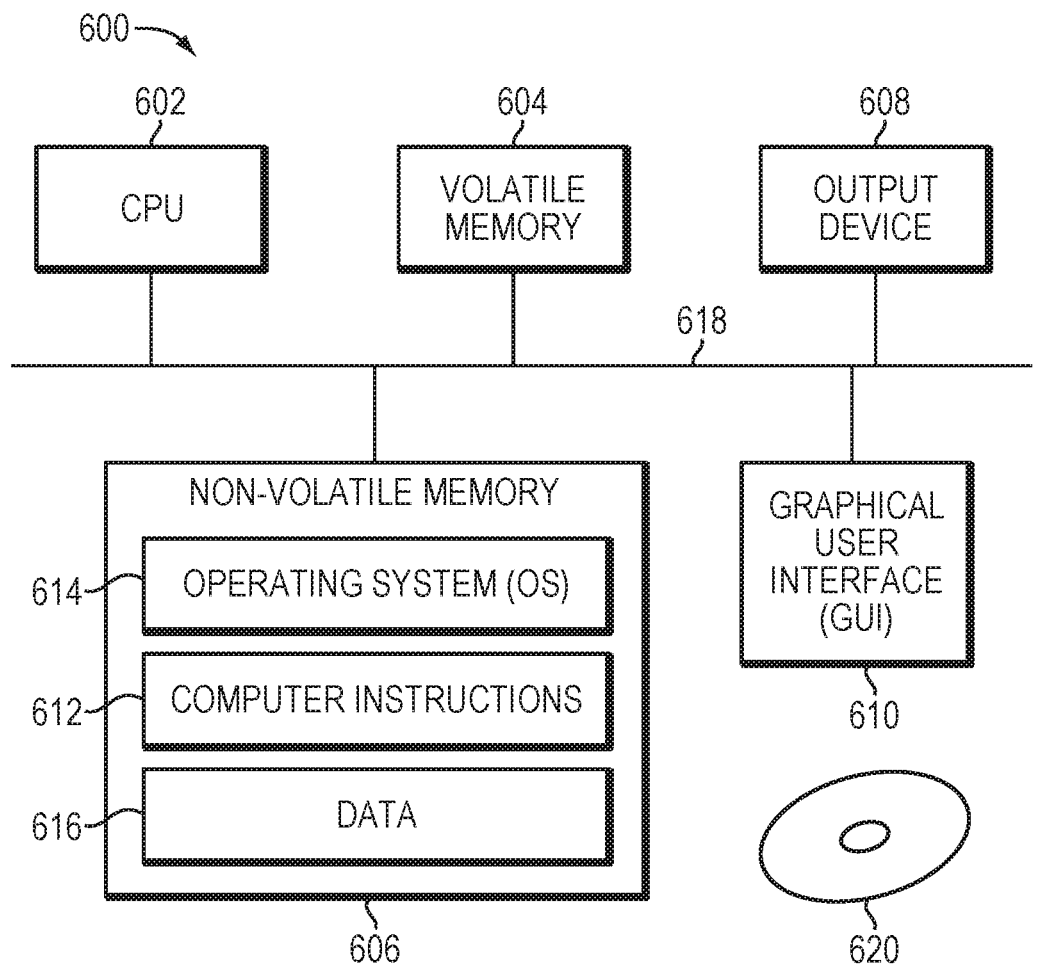
FIG. 6 is a block diagram of a computer, in accordance with an embodiment of the present disclosure.

FIG. 6 illustrates a block diagram of a computer 600 that can perform at least part of the processing described herein, according to one embodiment. The computer 600 may include a processor 602, a volatile memory 604, a non-volatile memory 606 (e.g., hard disk), an output device 608 and a graphical user interface (GUI) 610 (e.g., a mouse, a keyboard, a display, for example), each of which is coupled together by a bus 618. The non-volatile memory 606 may be configured to store computer instructions 612, an operating system 614, and data 616. In one example, the computer instructions 612 are executed by the processor 602 out of volatile memory 604. In one embodiment, an article 620 comprises non-transitory computer-readable instructions. In some embodiments, the computer 600 corresponds to a virtual machine (VM). In other embodiments, the computer 600 corresponds to a physical computer.

Figure 7:
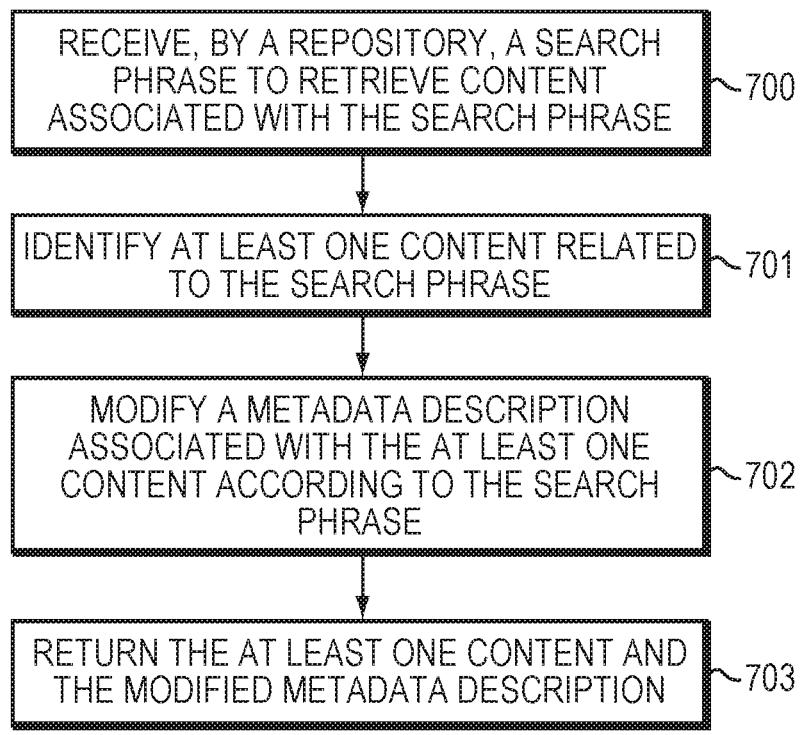
FIG. 7 is a flow diagram illustrating processes that may be used in connection with techniques disclosed herein.

Referring to FIG. 7, shown is a more detailed flow diagram illustrating managing content searches in computing environments. With reference also to FIGS. 1-6, the method receives, by a repository such as repository, a search phrase to retrieve content associated with the search phrase (Step 700). For example, a user enters a search phrase into a search engine, such as "ProSupport Plus benefits". The search phrase is received by a web crawler, robot.txt. The sitemap directs the web crawler to the appropriate content. The method identifies at least one content related to the search phrase (Step 701). In an example embodiment, based on the search phrase, the method aggregates a set of related contents into a search pool, where each related content is indexed based on a respective metadata description associated with a respective related content. In an example embodiment, the method pools all related contents based on the search phrase. For example, as illustrated in FIG. 2, the related content is indicated as "A, B, C, D, and E". The method selects at least one content from the search pool. From the pooled results, the method identifies the best fit result, in this scenario, document "A". In an example embodiment, the method determines that the metadata description associated with the document "A" is not the best fit for the search phrase entered into the search engine, and the content is sent from the repository to the metadata description converter. The sitemap then instructs the web crawler to select the modified metadata description from the second repository instead of from the repository.

In an example embodiment, the method provides the metadata description of the content to a metadata description converter, in this scenario, document "A". The metadata description converter is a software algorithm that analyzes the search phrase and designs a dynamic metadata description based on the search phrase. Thus the content that is returned from the search engine query is mapped to the search phrase the customer searched for to encourage the customer to select the content that is relevant to the search phrase. In an example embodiment, the dynamic modification of the metadata description changes with each search phrase since customers might search for the same content using a variety of search phrases.

In an example embodiment, the metadata description converter fetches the search phrase, and removes generic words, such as "a", "an", "the", etc. As illustrated in FIG. 4, the metadata description converter analyzes the search phrase and creates a set of keywords that are similar to the search phrase. In an example embodiment, the method identifies similar keywords in the selected content. The method then appends synonyms in the existing content, using the similar keywords and keyword phrases that were created from the search phrase. The method then produces a valid statement that is similar to the search phrase. The method runs a correlation algorithm to ensure that the newly formed modified metadata description reflects the core essence of the indexed content and the search phrase. The method validates the newly formed modified metadata description against guidelines associated with the information providers that supply the content in the repository.

In an example embodiment, the metadata description converter receives the metadata description associated with the content, where the metadata description comprises at least one term, and replaces at least one term with at least one keyword, where the search phrase comprises at least one keyword. In an example embodiment, the method identifies terms in the content that are similar to at least one keyword in the search phrase, and creates the modified metadata description from the identified terms. In an example embodiment, the method modifies a metadata description associated with the content according to the search phrase (Step 702).

As illustrated in FIG. 3, the method modifies the original metadata description to create the modified metadata description to contain keywords in the search phrase that the customer entered into the search engine for example, "ProSupport Plus benefits". FIG. 3 illustrates the original search engine result (containing the original metadata description), and the new search engine result (containing the modified metadata description). In this example embodiment, the search phrase keywords are highlighted.

In an example embodiment, the method validates the modified metadata description for description accuracy, for example, by suggesting best fit sentences and/or paragraphs. In an example embodiment, the method highlights keywords and/or key phrases. As illustrated in FIG. 2, the method creates the modified metadata description, depicted as "A.1". In an example embodiment, the method stores the modified metadata description in a second repository.

The method returns the content and the modified metadata description (Step 103) as a result of the search engine query. In an example embodiment, the method receives, from the second repository, the modified metadata description and a link to the content, where the content resides in the repository. Thus, the method returns the content from the repository, and the modified metadata description from the second repository. In other words, when the customer clicks on a link from the search engine results pages (SERP), the user is directed to the content that resides in the repository. As a result, as illustrated in FIG. 3, the customer selects (i.e., clicks on a link) content that is relevant to the search phrase entered by the customer, due to the modified metadata description. The modified metadata description is more relevant because the modified metadata description contains the key words and phrases contained in the search phrase. In other words, the customer is presented with the relevant content and, more importantly, is persuaded to select that relevant content, thereby increasing the CRO, and preventing an unnecessary call to Tech Support.

In an example embodiment, when the method stores the modified metadata description in the second repository, the method restricts a web crawler from indexing the repository. In an example embodiment, the method instructs, via a sitemap, a web crawler to select the modified metadata description from the second repository instead of selecting the metadata description from the repository in which the one content resides. In an example embodiment, a web crawler, such as a robot.txt in the repository is modified to restrict the second repository from being indexed and followed by the robot.txt file. An example robot.txt file is listed below:

User-agent: *
Allow: /*/compare.aspx*s=biz*
. . .
Disallow: /*/compare.aspx
Disallow: /Second_Repository/*

In this example embodiment, the robot.txt file has been created to restrict (via the "Disallow" statement) a web crawler from indexing and/or following any of the contents in the second repository (i.e., the modified metadata descriptions).

In an example embodiment, an HTML file in the repository defines a robots metadata tag to allow a search engine crawler (i.e., a web crawler) to index and follow the files (i.e., the searchable content) in the repository. The HTML file also contains code to refresh the repository with the modified metadata descriptions in the second repository in zero seconds to ensure that the modified metadata description is sent as the HTML response when the search engine returns the selected content as the result of the search engine search. For example, a Robots metadata tag may be defined to allow the search engine crawler to index and follow the first repository HTML files. The metadata tag may be, for example, "<META NAME="ROBOTS"

CONTENT="NONE">". In an example embodiment, the HTML file may also include metadata tags, such as, "<meta http-equiv="refresh" content="0; http://dell.com/support/Second_Repository.html"/>", to refresh the first repository HTML file with contents of the second repository HTML file in, for example, zero seconds. This ensures that the second repository HTML file is sent as the HTML response during a search query using the search phrase. It should be noted that the repository HTML file content remains the same and it is the Repository HTML file that is displayed to the customer when the customer selects the link. In other words, the metadata description is modified, but the hyperlink to the content displayed remains the same. In an example embodiment, an HTML file in the second repository defines a robots metadata tag to disallow a search engine crawler from indexing and following the files (i.e., the modified metadata descriptions) in the second repository. The robots metatag may be, for example, "<META NAME="ROBOTS" CONTENT="NOINDEX, NOFOLLOW">", to stop a search engine crawler from indexing and following the HTML files in the second repository.

In an example embodiment, the method identifies the content in response to receiving a new search phrase to retrieve content associated with the new search phrase, and returns the content and the modified metadata description. Thus, during future searches, if the appropriate modified metadata description is already available in the second repository, the modified metadata description is sent directly from the second repository to the search engine result, without going through the metadata description converter. If a user searches for the same search phrase, the method avoids sending the content to the metadata description converter, and instead sends the modified metadata description directly from the second repository.

In an example embodiment, the success rate of the CRO may be measured, for example, by measuring the number of RFI calls to Tech Support for a search phrase using the original metadata description versus using the modified metadata description. If the number of RFI calls is reduced, then it may be determined that the CRO has been increased due to the modified metadata description for the search phrase.

In an example embodiment, there exists a feedback loop to determine the success rate of the modified metadata description for the search phrase. If it is determined that the modified metadata description has been successful in converting the customer from a "visitor" to a "consumer of the information", the metadata description in the repository may be modified to use the modified metadata description in the second repository instead of the original metadata description that was stored in the repository. In other words, the original metadata description in the repository will be overwritten with the modified metadata description from the second repository.

There are several advantages to embodiments disclosed herein. For example, the method improves the conversation rate by dynamically modifying the metadata description result of the search engine search to ensure that customers will consume the information provided by the results of the search engine search. The method reduces the dependency to call Tech Support when the information is already provided by the search engine results. The method uses the robot.txt and the sitemap files to return a modified metadata description without modifying the existing infrastructure or without adding an extra layer of hardware.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGS. illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of managing content searches in computing environments, the method comprising:
   receiving, by a repository from a user, a search phrase to retrieve content associated with the search phrase;
   identifying, at the repository, at least one content related to the search phrase;
   modifying, at the repository, the metadata description associated with the at least one content, the metadata description modified to include keywords from the search phrase;
   validating the metadata description for technical accuracy; and
   returning, by the repository, the at least one content and the modified metadata description to the user in response to receiving the search phrase, wherein the modified metadata description is rendered in a search engine with the keywords in the search phrase that were added to the metadata description highlighted.

2. The method of claim 1, further comprising:
   storing the modified metadata description in a second repository;
   identifying the at least one content in response to receiving a new search phrase to retrieve content associated with the new search phrase; and
   returning the at least one content and the modified metadata description.

3. The method of claim 2, wherein storing the modified metadata description in the second repository comprises:
   restricting a web crawler from indexing the second repository.

4. The method of claim 1, wherein identifying the at least one content related to the search phrase comprises:
   based on the search phrase, aggregating a set of related contents into a search pool, wherein each related content is indexed based on a respective metadata description associated with a respective related content;
   selecting the at least one content from the search pool; and
   providing the metadata description of the at least one content to a metadata description converter, wherein the metadata description converter analyzes the search phrase and creates a set of keywords that are similar to the search phrase.

5. The method of claim 4, wherein modifying the metadata description associated with the at least one content according to the search phrase comprises:
   receiving, by the metadata description converter, the metadata description associated with the at least one content, wherein the metadata description comprises at least one term; and
   replacing the at least one term with at least one keyword, where the search phrase comprises the at least one keyword.

6. The method of claim 5, wherein replacing the at least one term with the at least one keyword comprises:
   identifying terms in the at least one content that are similar to the at least one keyword in the search phrase; and
   creating the modified metadata description from the identified terms.

7. The method of claim 6, wherein creating the modified metadata description from the identified terms comprises:
   validating the modified metadata description for description accuracy.

8. The method of claim 1, wherein returning the at least one content and the modified metadata description comprises:
   receiving, from the second repository, the modified metadata description and a link to the at least one content, wherein the at least one content resides in the repository.

9. The method of claim 1, wherein returning the at least one content and the modified metadata description comprises:
   instructing, via a sitemap, a web crawler to select the modified metadata description from the second repository instead of selecting the metadata description from the repository in which the at least one content resides.

10. A system for use in managing content searches in computing environments, the system comprising a processor configured to:
    receive, by a repository from a user, a search phrase to retrieve content associated with the search phrase;
    identify, at the repository, at least one content related to the search phrase;
    modify, at the repository, the metadata description associated with the at least one content, the metadata description modified to include keywords from the search phrase;
    validate the metadata description for technical accuracy; and
    return, by the repository, the at least one content and the modified metadata description to the user in response to receiving the search phrase, wherein the modified metadata description is rendered in a search engine with the keywords in the search phrase that were added to the metadata description highlighted.

11. The system of claim 10, further configured to:
    store the modified metadata description in a second repository;
    identify the at least one content in response to receiving a new search phrase to retrieve content associated with the new search phrase; and
    return the at least one content and the modified metadata description.

12. The system of claim 11, wherein the processor configured to store the modified metadata description in the second repository is further configured to:
    restrict a web crawler from indexing the second repository.

13. The system of claim 10, wherein the processor configured to identify the at least one content related to the search phrase is further configured to:
    based on the search phrase, aggregate a set of related contents into a search pool, wherein each related content is indexed based on a respective metadata description associated with a respective related content;
    select the at least one content from the search pool; and
    provide the metadata description of the at least one content to a metadata description converter, wherein the metadata description converter analyzes the search phrase and creates a set of keywords that are similar to the search phrase.

14. The system of claim 13, wherein the processor configured to modify the metadata description associated with the at least one content according to the search phrase is further configured to:
    receive, by the metadata description converter, the metadata description associated with the at least one content, wherein the metadata description comprises at least one term; and
    replace the at least one term with at least one keyword, where the search phrase comprises the at least one keyword.

15. The system of claim 14, wherein the processor configured to replace the at least one term with the at least one keyword is further configured to:

identify terms in the at least one content that are similar to the at least one keyword in the search phrase; and create the modified metadata description from the identified terms.

16. The system of claim 15, wherein the processor configured to create the modified metadata description from the identified terms is further configured to:

validate the modified metadata description for description accuracy.

17. The system of claim 10, wherein the processor configured to return the at least one content and the modified metadata description is further configured to:

receive, from the second repository, the modified metadata description and a link to the at least one content, wherein the at least one content resides in the repository.

18. The system of claim 10, wherein the processor configured to return the at least one content and the modified metadata description is further configured to:

instruct, via a sitemap, a web crawler to select the modified metadata description from the second repository instead of selecting the metadata description from the repository in which the at least one content resides.

19. A computer program product for managing content searches in computing environments, the computer program product comprising:

a non-transitory computer readable storage medium having computer executable program code embodied therewith, the program code executable by a computer processor to:

receive, by a repository from a user, a search phrase to retrieve content associated with the search phrase;

identify, at the repository, at least one content related to the search phrase;

modify, at the repository, the metadata description associated with the at least one content, the metadata description modified to include keywords from the search phrase;

validating the metadata description for technical accuracy; and return, by the repository, the at least one content and the modified metadata description to the user in response to receiving the search phrase, wherein the modified metadata description is rendered in a search engine with the keywords in the search phrase that were added to the metadata description highlighted.

20. The computer program product of claim 19, wherein the program code configured to modify the metadata description associated with the at least one content according to the search phrase is further configured to:

receive, by a metadata description converter, the metadata description associated with the at least one content, wherein the metadata description comprises at least one term; and replace the at least one term with at least one keyword, where the search phrase comprises the at least one keyword.

* * * * *